2,845,703
Patented Aug. 5, 1958

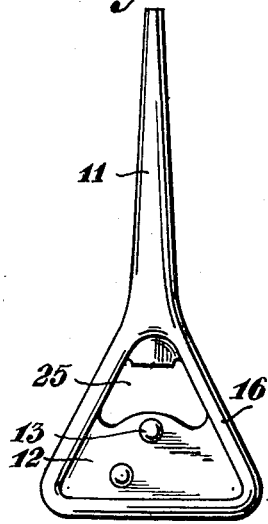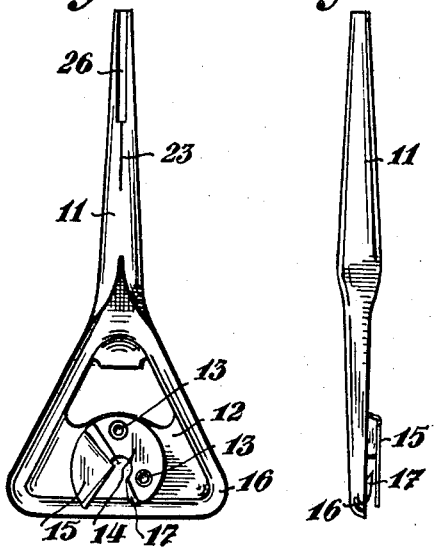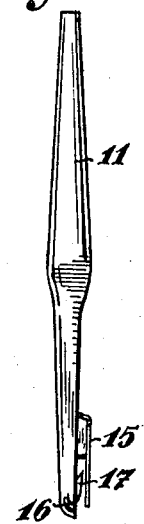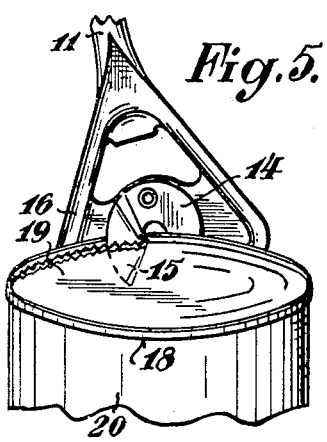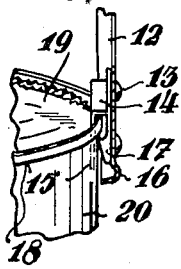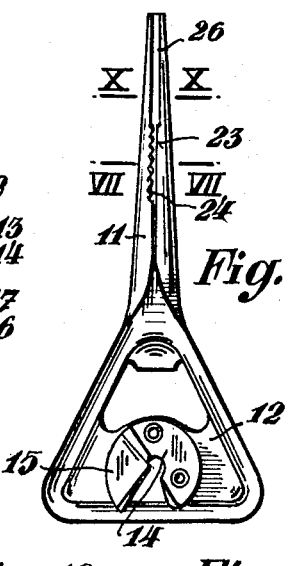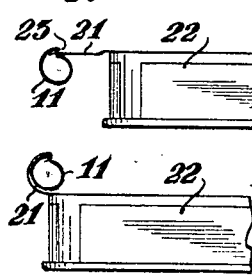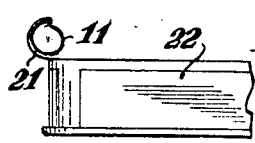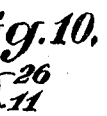
Aug. 5, 1958     A. A. M. FILLATRE ET AL     2,845,703
COMBINED TOOL FOR OPENING TINS AND OTHER CONTAINERS
Filed Sept. 20, 1956
INVENTORS
ALPHONSE A.M. FILLATRE
CATHERINE COENEN FILLATRE
By *Toulmin & Toulmin*
Attorneys

United States Patent Office

2,845,703

COMBINED TOOL FOR OPENING TINS AND OTHER CONTAINERS

Alphonse Adolphe Marie Fillatre and Catherine Coenen Fillatre, Dilbeek-Brussels, Belgium Application September 20, 1956, Serial No. 611,004

Claims priority, application Belgium September 23, 1955

2 Claims. (Cl. 30—22)

Our invention has as object a combined tool for opening containers, particularly tins of preserved food, the soldered lids of which tins must be removed by cutting them out or stripping them off.

Independent tools are already known for opening containers, the design of these tools varying according to whether the lid has to be cut out, as is the case, for example, with tins of preserved fruit or vegetables; or, being provided with a special tongue, has to be removed by stripping it off and coiling it, as is generally the case with tins of preserved fish.

These various known tools are, however, of only mediocre efficiency, and necessitate awkward and often dangerous handling.

The combined tool according to the invention not only offers the advantage resulting from combining, in a single tool, the two tools indispensable for enabling a container with soldered lid to be opened, whether the latter is to be removed by cutting out or stripping off, but also the advantage of increased efficiency of operation, by reason of its shape, when using either the one or the other of the two tools in combination, and the realization of a tool that is easily handled, and without danger for the user.

To this end, the combined tool according to the invention comprises a hollow handle, tapering to one end with a slot in it, the said handle being stamped out of steel plate or other suitable hard material; the said handle, at its end of largest diameter, broadening out into a widened part which serves to carry a knife designed to cut out the lid of the container, this widened part serving moreover as a grip for maneuvering the tool constituted by the hollow handle which is designed to remove container lids with tongues by stripping them off and coiling them.

Also according to the invention, the part of the hollow handle, forming the tool for stripping off tongued lids, has a spiral profile suitable for ensuring that the said lid tongue easily introduces itself into the slot in this handle, at the same time ensuring that the end of this tongue shall be caught up in the slot of the said hollow handle, the end tracing the largest radius of this spiral being preferably provided with teeth in order to ensure that the end of the tongue of the lid is properly gripped.

Other particularities of the invention will become apparent from the following description of a preferred embodiment of the combination tool, object of the invention, given with reference to the accompanying drawings, in which:

Figure 1 is a view, in elevation, of one side of the tool according to the invention.

Figure 2 is a view, in elevation, of the other side of that tool.

Figure 3 is a view, in elevation, of the same tool turned through 90°.

Figure 4 shows the position in which the cutting tool grips the rim of a tin of preserved food.

Figure 5 shows the operation of cutting out the lid of the can shown in Figure 4.

Figure 6 shows a tool similar to that of Figure 2, but provided with teeth for gripping the tongue of a lid.

Figure 7 is a sectional view, along line VII—VII of Figure 6, drawn on a larger scale.

Figures 8 and 9 show respectively the catching up and rolling of the tongue by means of the tool handle.

Figure 10 is a section along line X—X of Figure 6, drawn to a larger scale.

As shown by the various figures, the tool comprises a hollow handle 11 of tapered form, having at its large-diameter end a widened part 12 on which is fixed, by means of rivets 13, a knife 14, the blade 15 of which is separated from the plane of its support by an amount sufficient, as Figure 3 more particularly shows, for it to lie appreciably outside the plane of the stiffening edge 16.

Figure 4 shows that the other end of knife 14 is curved so as to form a catch or stop 17 intended to engage with the rim 18 of the lid 19 of the tin 20.

This same Figure 4, as well as Figure 5, show that it is sufficient to bring about this engagement of the stop 17 with the lower face of the external rim 18 in order to cut into the lid 19, and, by simply oscillating the tool by means of the hollow handle 11, acting as a powerful lever arm, to ensure, with great ease for the user, the progressive cutting out of the lid 19. It should be noted that the cutting edge of the knife 15 is turned towards the exterior of the tool so that during each oscillation of the latter the said blade 15 enters into the metal, thus avoiding the formation of raised points or tags of metal along the cut edge of the lid, which points or tags would be likely to wound the user.

Figure 7 shows that the hollow handle 11 traces a profile in the form of a spiral. Such an arrangement favours the introduction of the tongue 21 of a tin such as 22 (Figure 8) into the the slot 23 in the handle 11.

As Figures 8 and 9 show, when the the tongue 21 has been introduced into the slot 23, a rotation given to the handle 11 has the effect of producing a folding of the end of the tongue 21 so as to ensure a preliminary catching up of the said end in the slot 23 of the handle 11. The continuation of the movement of rotation of the handle 11 then enables the lid of the tin 22 to be stripped off, the widened part 12 of the tool this time serving to grip and turn the tool formed by the handle 11.

When the tin 22 has been completely opened, and the lid still remains partially attached to the tin, it is sufficient to give the handle 11 a turn in the reverse direction in order to disengage the handle 11 from the bend formed at the end of the tongue. Since the handle 11 is tapered, it can easily be withdrawn from the coiled lid.

In order to ensure a particularly effective grip on the end of the tongue 21, the large-diameter end of the slot in the handle 11 is provided with teeth, as is shown more particularly in Figure 6.

Finally, the combined tool according to the invention may have, in its widened part, an opening 25 enabling the cap of a bottle to be removed, whilst the end of handle 11, with a larger slot 26, may advantageously be used to remove lids which have become depressed into their container.

What we claim is:

1. A tool of the nature described comprising; a tapering metallic handle portion, said handle portion terminating in a substantially flat triangular enlargement at its larger end, a knife means fixed to said flattened triangular portion, said knife means being adapted for cutting out lids of cans, and said flattened triangular portion having a stiffening recess formed thereabout and joining with the tubular handle whereby an extremely rigid structure results and wherein the enlarged flattened triangular portion shields the edge of the can being opened by the knife from the hand of the operator.

2. A tool according to claim 1, in which the said knife consists of an arcuate strip of metal having a cutting blade extending downwardly and at an angle to the vertical while on the opposite side of a vertical axis the said knife has a projection adapted for engagement beneath the outer edge of the lid portion of a cam for holding the tool downwardly so that the knife can be driven into the lid.

No references cited.